United States Patent [19]

Wei

[11] Patent Number: 5,056,112
[45] Date of Patent: Oct. 8, 1991

[54] INTERLEAVING IN CODED MODULATION FOR MOBILE RADIO

[75] Inventor: Lee-Fang Wei, Lincroft, N.J.

[73] Assignee: AT&T Bell Laboratories, Murray Hill, N.J.

[21] Appl. No.: 457,438

[22] Filed: Dec. 27, 1989

Related U.S. Application Data

[63] Continuation-in-part of Ser. No. 386,185, Jul. 28, 1989, Pat. No. 5,029,185.

[51] Int. Cl.[5] ............................................. H04L 27/10
[52] U.S. Cl. ....................................... 375/53; 371/43; 375/57
[58] Field of Search ........................ 375/25, 29, 39, 42, 375/43, 57; 371/43, 44, 45; 332/103; 370/20

[56] References Cited

U.S. PATENT DOCUMENTS

| | | | |
|---|---|---|---|
| 4,483,012 | 11/1984 | Wei | 375/27 |
| 4,520,490 | 5/1985 | Wei | 375/39 |
| 4,597,090 | 6/1986 | Forney, Jr. | 375/42 |
| 4,713,817 | 12/1987 | Wei | 375/39 |
| 4,755,998 | 7/1988 | Gallager | 375/27 |
| 4,780,884 | 10/1988 | Karabinis | 375/43 |

Primary Examiner—Stephen Chin
Attorney, Agent, or Firm—Ronald D. Slusky

[57] ABSTRACT

Interleavers used in fading channel applications can be matched to a particular trellis or block code being used. This matching can occur even in a particular transmission scheme such as TDMA. Matching both the interleaver and the code increases the separation between interdependent signal points and provides an improvement in error performance, without an increase in time delay over known interleaver design.

37 Claims, 11 Drawing Sheets

| | A | B | C | D |
|---|---|---|---|---|
| | $P_1$ | $P_2$ | $P_3$ | $P_4$ |
| | $P_5$ | $P_6$ | $P_7$ | $P_8$ |
| J | $P_9$ | $P_{10}$ | $P_{11}$ | $P_{12}$ |
| | ⋮ | ⋮ | ⋮ | ⋮ |
| | $P_{4J-3}$ | $P_{4J-2}$ | $P_{4J-1}$ | $P_{4J}$ |

INPUT MATRIX
COLUMN OF SIGNAL POINTS OUTPUT IN ORDER A,C,B,D:

| | A | B | C | D |
|---|---|---|---|---|
| | $P_1$ | $P_3$ | $P_2$ | $P_4$ |
| | $P_5$ | $P_7$ | $P_6$ | $P_8$ |
| J | $P_9$ | $P_{11}$ | $P_{10}$ | $P_{12}$ |
| | ⋮ | ⋮ | ⋮ | ⋮ |
| | $P_{4J-3}$ | $P_{4J-1}$ | $P_{4J-2}$ | $P_{4J}$ |

TRANSFORMED MATRIX
COLUMN OF SIGNAL POINTS OUTPUT IN ORDER A,B,C,D:

OUTPUT SEQUENCE WITH 2J SIGNAL INTERVAL SEPARATION
$$\begin{bmatrix} P_1, P_5, P_9, \ldots, P_{4J-3}, P_3, P_7, P_{11}, \ldots, P_{4J-1}, \\ P_2, P_6, P_{10}, \ldots, P_{4J-2}, P_4, P_8, P_{12}, \ldots, P_{4J} \end{bmatrix}$$

| INPUT BIT PATTERN | FIRST SIGNAL POINT | SECOND SIGNAL POINT |
|---|---|---|
| 0 0 0 | 0 | 0 |
| 0 0 1 | 1 | 5 |
| 0 1 1 | 2 | 2 |
| 0 1 0 | 3 | 7 |
| 1 1 0 | 4 | 4 |
| 1 1 1 | 5 | 1 |
| 1 0 1 | 6 | 6 |
| 1 0 0 | 7 | 3 |

NEXT STATE
$(W1_{(n+1)}, W2_{(n+1)}, W3_{(n+1)})$

| CURRENT STATE $(W1_n, W2_n, W3_n)$ | (000) | (001) | (010) | (011) | (100) | (101) | (110) | (111) |
|---|---|---|---|---|---|---|---|---|
| 000 | 0 | 2 | 4 | 6 | | | | |
| 001 | | | | | 1 | 3 | 5 | 7 |
| 010 | 2 | 0 | 6 | 4 | | | | |
| 011 | | | | | 3 | 1 | 7 | 5 |
| 100 | 4 | 6 | 0 | 2 | | | | |
| 101 | | | | | 5 | 7 | 1 | 3 |
| 110 | 6 | 4 | 2 | 0 | | | | |
| 111 | | | | | 7 | 5 | 3 | 1 |

FIG. 14

|   | A | B |
|---|---|---|
| 1 | $P_1$ | $P_2$ |
| 2 | $P_3$ | $P_4$ |
| 3 | $P_5$ | $P_6$ |
| 4 | $P_7$ | $P_8$ |
| 5 | $P_9$ | $P_{10}$ |
| 6 | $P_{11}$ | $P_{12}$ |
| ⋮ | ⋮ | ⋮ |
| $J/2+1$ | $P_{J+1}$ | $P_{J+2}$ |
| $J/2+2$ | $P_{J+3}$ | $P_{J+4}$ |
| $J/2+3$ | $P_{J+5}$ | $P_{J+6}$ |
| $J/2+4$ | $P_{J+7}$ | $P_{J+8}$ |
| $J/2+5$ | $P_{J+9}$ | $P_{J+10}$ |
| ⋮ | ⋮ | ⋮ |
| $J-4$ | $P_{2J-9}$ | $P_{2J-8}$ |
| $J-3$ | $P_{2J-7}$ | $P_{2J-6}$ |
| $J-2$ | $P_{2J-5}$ | $P_{2J-4}$ |
| $J-1$ | $P_{2J-3}$ | $P_{2J-2}$ |
| $J$ | $P_{2J-1}$ | $P_{2J}$ |

ROW ORDER: 1, $J/2+1$, 5, $J/2+5$,...,$J-3$, 2, $J/2+2$, etc.

TRANSMISSION:

J/4 SEPARATION

FIG. 16

|   | A | B | C | D |
|---|---|---|---|---|
| 1 | $P_1$ | $P_2$ | $P_3$ | $P_4$ |
| 2 | $P_5$ | $P_6$ | $P_7$ | $P_8$ |
| 3 | $P_9$ | $P_{10}$ | $P_{11}$ | $P_{12}$ |
| ⋮ | ⋮ | ⋮ | ⋮ | ⋮ |
| $J/2+1$ | $P_{2J+1}$ | $P_{2J+2}$ | $P_{2J+3}$ | $P_{2J+4}$ |
| $J/2+2$ | $P_{2J+5}$ | $P_{2J+6}$ | $P_{2J+7}$ | $P_{2J+8}$ |
| $J/2+3$ | $P_{2J+9}$ | $P_{2J+10}$ | $P_{2J+11}$ | $P_{2J+12}$ |
| ⋮ | ⋮ | ⋮ | ⋮ | ⋮ |
| $J-2$ | $P_{4J-11}$ | $P_{4J-10}$ | $P_{4J-9}$ | $P_{4J-8}$ |
| $J-1$ | $P_{4J-7}$ | $P_{4J-6}$ | $P_{4J-5}$ | $P_{4J-4}$ |
| $J$ | $P_{4J-3}$ | $P_{4J-2}$ | $P_{4J-1}$ | $P_{4J}$ |

COLUMN ORDER: A, B, C, D
ROW ORDER: 1, $J/2+1$, 3, $J/2+3$, ..., $J-1$, 2, $J/2+2$, 4, ..., $J$

SEQUENCE $P_1, P_{2J+1}, P_9, P_{2J+9}, \ldots, P_{4J-7}, P_5, P_{2J+5}, P_{13}, \ldots, P_{4J-3}$

J/2 SEPARATION

INTERLEAVING IN CODED MODULATION FOR MOBILE RADIO

CROSS-REFERENCE TO RELATED APPLICATION

This is a continuation in part of application Ser. No. 386,185, filed July 28, 1989, U.S. Pat. No. 5,029,185.

BACKGROUND OF THE INVENTION

The present invention relates to interleavers used in coded modulation methods and, more particularly, the use of interleavers in fading channel applications, e.g., digital cellular mobile radio.

For some communication channels, coded modulation methods have been found to provide a "coding gain" in signal power (compared to so-called "uncoded" modulation methods) with the result of improving the error performance of the system without requiring additional bandwidth. For example, trellis coded modulation has proven to be a practical power-efficient and bandwidth-efficient modulation method for "random-error" channels characterized by additive white Gaussian noise (AWGN). This method is now being widely used in commercial telephone-line modems and has resulted in an increase of line rates of those modems to as much as 19.2 Kbits/s.

Those in the art, as in the above-mentioned co-pending parent application, are now investigating the applicability of trellis and block coded modulation methods to "burst-error" channels, such as, "fading" channels, i.e., channels in which the signal amplitude can become so weak that accurate recovery of the transmitted information is difficult. These fading channels can be found, for example, in the digital cellular mobile radio environment (hereafter referred to more simply as "mobile radio"). In applying a block or trellis coded modulation method to mobile radio, it is desirable that the code exhibit a property called "time diversity" to improve the error performance of the communication system. This time diversity is manifested by an interdependence between the signal points that are produced by the coded modulation method. For example, consider the case where two signal points are produced over a time interval and there is a time-diverse interdependence between these signal points. As a result of this interdependence, the input data represented by the two signal points may be able to be accurately recovered even if one of the transmitted signal points is lost. However, the improvement in the error performance due to this time-diverse interdependence is limited in the mobile radio environment because typically a burst error extends over a number of time adjacent signal points. Continuing the above example, if both time-diverse transmitted signal points were lost due to a burst error, the input data may not be able to be accurately recovered. As such, the interdependence of signal points alone cannot be relied on to permit accurate recovery of the original signal. Rather, in such environments, an interleaver is often used to separate the interdependent (time-diverse) points to reduce the effects of the fading channel and further improve the error immunity of the system.

In accordance with known interleaver design, an interleaver collects, or frames, the signal points to be transmitted into a matrix, where the matrix is sequentially filled up a row at a time. After a predefined number of signal points have been framed, the interleaver is emptied by sequentially reading out the columns of the matrix for transmission. As a result, signal points in the same row of the matrix that were near each other in the original signal point flow are separated by a number of signal points equal to the number of rows in the matrix. Ideally, in design of the interleaver, the number of columns and rows would be picked such that interdependent signal points, after transmission, would be separated by more than the expected length of the error burst for the channel. However, this may not be practicable, for as the number and rows are increased, so is the signal delay due to the framing of the signal points. As a result, there is a system constraint on the size of the interleaver in order to keep the signal delay within acceptable limits. On the other hand, constraining the size of the interleaver limits the separation of those time-diverse interdependent signal points and, as a result, the improvement in error performance due to the interleaver.

SUMMARY OF THE INVENTION

As noted above, in applying coded modulation methods which exhibit time diversity to communication channels that display burst-error characteristics, such as mobile radio, the prior art has recognized that application of an interleaver improves the error performance of the system. At the same time, however, I have recognized that the error performance can be yet further improved by matching the X-fold time diversity of the particular block or trellis code being used with the particular reordering sequence of the interleaver.

In particular, the code and interleaver are matched in preferred embodiments of the invention when for any pair of a set of interdependent signal points in the interleaved signal point stream, those interdependent signal points contributing to the X-fold time diversity of the code are minimally separated by $D_2 > D_1$, where $D_1$ is the minimum separation between such interdependent signal points. This further increases the error immunity of the system while not increasing the required size of the interleaver matrix. Thus the advantages of the interleaver matrix are achieved without introducing any additional delay.

In accordance with a feature of the invention, I have realized that one way to adapt the interleaver to be matched to a particular given code is to form a transformed matrix from the elements of the interleaver and then read out adjacent columns of the transformed matrix. With this approach, the distance between particular interdependent signal points that contribute to the X-fold diversity of the code can be increased over that which would be provided following the known interleaver approach.

Moreover, there may be situations where interdependent signal points are not confined to a particular row, but are spread across adjacent rows. As a result, a reordering of the columns of the interleaver will not affect, nor separate, interdependent signal points in the same column. These interdependent signal points will now be susceptible to burst errors and to demodulator-induced noise. (In preferred embodiments a constant-amplitude type of signal constellation is used in order to account for the fast variations in signal amplitude that is the hallmark of mobile radio and some other fading channels. Moreover, due to the fast variation in carrier phase that occurs in such channels, use of a non-coherent differential detection method is preferred. Both of these criteria are advantageously satisfied by the use of M- point differential phase shift keying, or M-DPSK. However, the M-DPSK demodulation process introduces correlated noise samples between received adjacent signal points.)

These concerns are addressed in accordance with another feature of this invention, by additionally reordering the interdependent signal points within a column. As a result, the separation of signal points occurs in such a way so as to advantageously eliminate the correlation between noise samples introduced by the M-DPSK demodulating process and further guard against burst errors.

In addition, in known interleaver design approaches, no attempt has been made on separating interdependent signal points that are spread across adjacent frames. In accordance with another feature of this invention, I have realized that the particular reordering method can be changed for each sequential frame so that interdependent signal points which are spread across adjacent frames will be advantageously separated.

Finally, besides matching the interleaver to fit the trellis or block code with X-fold diversity, the code can be matched to a particular given interleaver, e.g., the straightforward interleaver of the prior art. Therefore, in accordance with another feature of my invention, the trellis or block code with X-fold time diversity can be matched to the known interleaver by generating a sequence of interdependent signal points, where any pair of interdependent signal points which exhibit X-fold time diversity are not adjacent, in contradistinction to the codes exhibiting time diversity in the prior art.

BRIEF DESCRIPTION OF THE DRAWING

In the drawing,

FIG. 14 illustrates the operation of the interleaver embodying the principles of the invention with respect to a two-dimensional trellis code with two-fold time diversity and a decoding depth of eight;

FIG. 16 illustrates the operation of a four column interleaver embodying the principles of the invention using the TDMA frame of FIG. 7.

DETAILED DESCRIPTION

In order to better understand interleaver operation it will be useful to first explain its operation in the context of a block code with X-fold time diversity.

Figure 1:
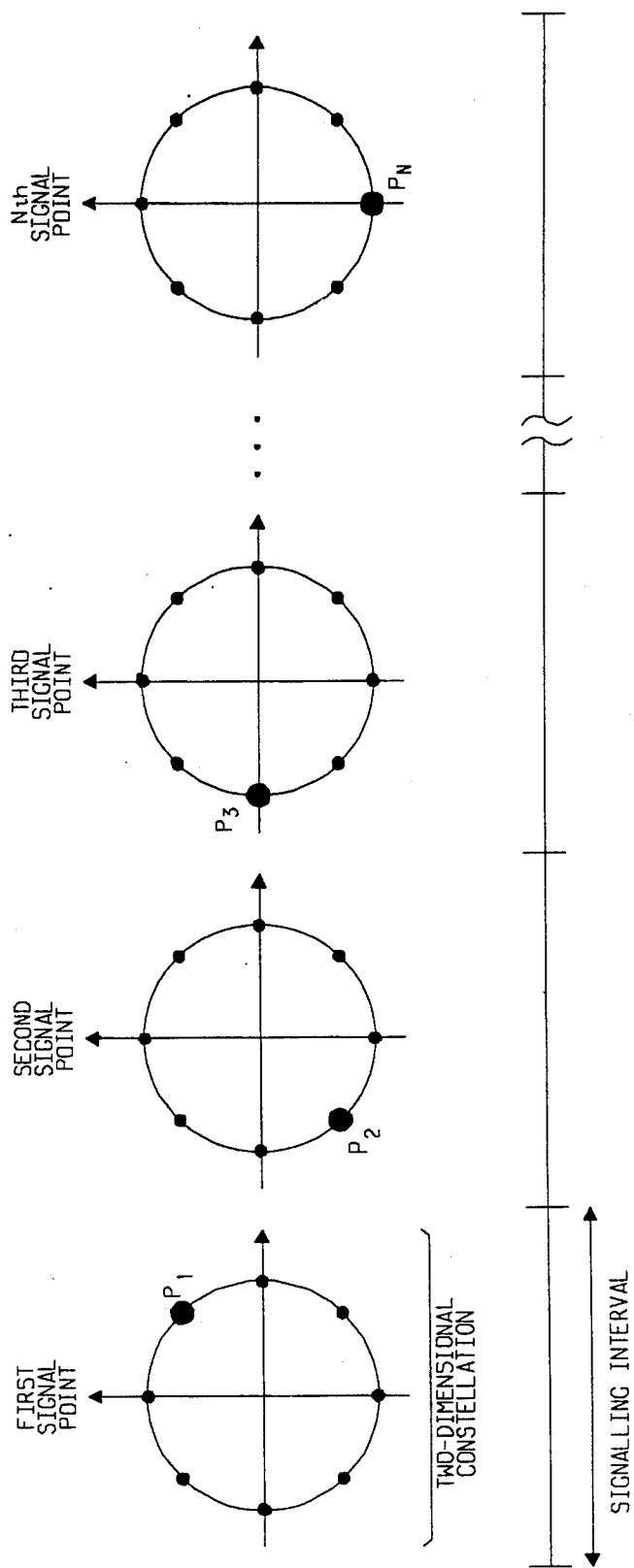
FIG. 1 is a chart illustrating N signal points produced over N signalling intervals, each signal point taken from an illustrative two-dimensional M-phase shift keying constellation.

In general, a block coded modulation repetitively operates on input data over N signalling intervals to produce a set of N interdependent signal points, one signal point in each signalling interval. The signal points are interdependent in that they are chosen together as a function of the particular input data values. Such a code is "2N-dimensional" since each of the N signal points is taken from a two-dimensional (2D) constellation. This is illustrated in FIG. 1, where each signal point ($P_i$) ($i=1,2\ldots$) is delivered during a respective signalling interval and represents a point from the predetermined 2D constellation—illustratively shown in FIG. 1 as a phase shift keying (PSK) constellation having eight signal points. Each collection, or set, of N signal points, over N signalling intervals, is a "codeword", and the assemblage of all permissible codewords is referred to as an alphabet.

A block code is said to have X-fold time diversity, where X is an integer greater than unity, if any permissible codeword differs from every other permissible codeword in at least X signal point positions. As an illustration, assume that N is equal to four (an eight-dimensional code) so that four interdependent signal points would be produced for each codeword every four signalling intervals. For example, in this instance, the code would exhibit an additional interdependency of two-fold time diversity if the values of the signal points of any codeword differ from those of any other codeword in at least two signal point positions. As a result of this time diversity, as long as at most one signal point of a codeword is lost, it is possible to recover the transmitted information. That is, information about the input data appears redundantly in the time domain within the coded signal, which improves the error performance in a fading channel environment, such as mobile radio.

Figures 2, 3:
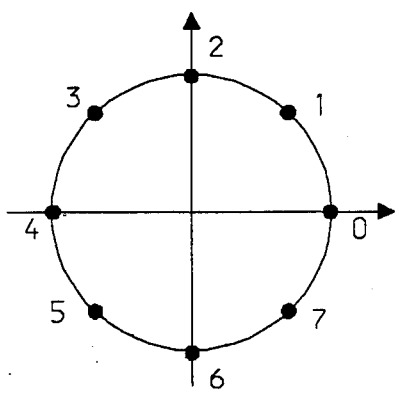
FIG. 2 shows an 8-PSK constellation which forms the basis of a first illustrative block code disclosed herein.
FIG. 3 depicts an alphabet for the first illustrative block code.

These concepts may be further understood by considering an illustrative block-coded modulation method with two-fold time diversity. In particular, an 8-PSK constellation is shown in FIG. 2 which is illustratively used as the basis of a four-dimensional block code having two signal points per codeword. The eight points of the constellation are labelled 0 through 7. The alphabet of the block code is shown in FIG. 3, wherein responding to 3 bit input data words, the block code generates two particular signal points, each having one of the labels 0 through 7.

Significantly, any pair of codewords of FIG. 3 differ in both of the signal point positions and, as a result of this difference, the code exhibits two-fold time diversity. For example, neither the first or second signal point values of the codeword (0,0) is the same as the first or second signal point values of any other codeword. Thus, if the first transmitted signal point were lost, but the second point "0" was received, the transmitted codeword could still be determined to have been (0,0), since no other codeword has "0" as the value for the second signal point.

It will be appreciated that if a particular one signal point is lost due to fading, there is a significant likelihood that a time-adjacent signal point may also be lost. Therefore, the error immunity afforded by the built-in time diversity of the block code can be enhanced by time-separating the adjacent signal points of each codeword via an interleaver so that it is less likely that the two points will fade concurrently. In accordance with known interleaver design, an interleaver collects, or frames, the signal points to be transmitted, into a matrix, where the matrix is sequentially filled up a row at a time. After a predefined number of signal points have been framed, the interleaver is emptied by sequentially reading out the columns of the matrix for transmission. As a result, any pair of interdependent signal points that were near each other in the original signal point flow are separated by a number of signal points equal to the number of rows (J) in the matrix.

The size of a frame is represented by the dimensions of an interleaver. That is, the size of the row dimension is equal to the number of rows (J), and the size of the column dimension is equal to the number of columns (K). These dimensions can be optimized for the parameters (J) and (K) and ideally, in design of an interleaver, the number of rows (J) would be picked such that interdependent signal points, after transmission, would be separated by more than the expected length of an error burst for the channel. For example, in mobile radio, the effectiveness of an interleaver is maximized when the parameter J is greater than or equal to ¼ of the carrier wavelength divided by the minimum vehicle speed of interest multiplied by the signalling rate. (This formula is based on the assumption that there is only a single user per mobile radio channel, as is the case when a frequency-division-multiplexing-access (FDMA) approach is used. The case where there is more than one user per channel, i.e., the so-called time-division-multiplexing-access (TDMA), will also be discussed below). On the other hand, the number of columns (K) is usually equal to the length of the block code (i.e. number of signal points in a block codeword). In particular applications, however, the dimensions of the interleaver may have to be less than optimum to limit the transmission (or framing) delay introduced by the interleaver. This may be necessary to ensure a desired level of data throughput or to avoid unnatural delays that may be otherwise introduced into a conversation. As a result, constraining the dimensions of the interleaver will involve tradeoffs in system design which can effect error performance.

In accordance with a feature of the invention, I have recognized that the interleaver design can be matched to the particular X-fold time diversity of the block coded modulation method being used in such a way that the separation interval ($D_2$) between interdependent time-diverse signal points that contribute to the X-fold diversity is increased over $D_1$, the minimal separation between any pair of interdependent signal points, which would be provided following the prior art interleaver approach. This further increases the error immunity of the system while not increasing the required size of the interleaver or the signal time delay associated with interleaver operation. In particular, I have realized that by re-arranging the order in which the columns of signal points are read out of the interleaver, the separation interval can be increased beyond the prior art J signalling intervals.

Figure 4:
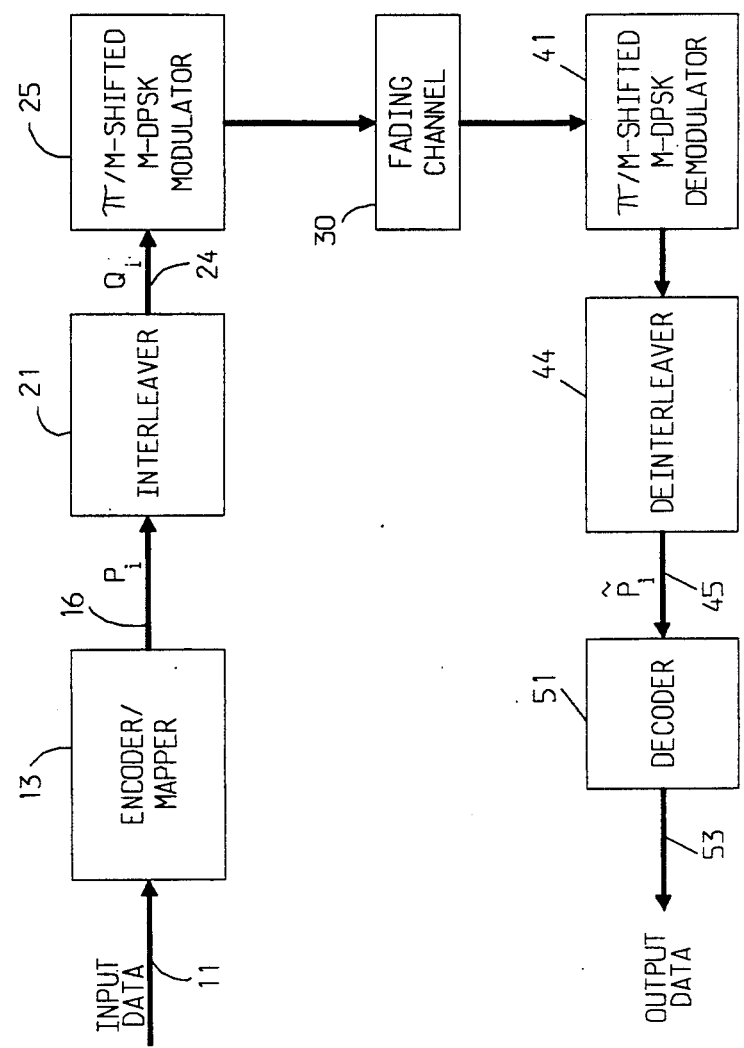
FIG. 4 is a block diagram of a data communications system which includes an interleaver embodying the principles of the invention.

An interleaver, embodying the principles of my invention, is shown in relation to the rest of a communication system in FIG. 4. Input data on lead 11 is applied to an encoder/mapper 13 at a rate of m bits per T-second signalling interval. The encoder/mapper 13 collects N signalling intervals of input data, and outputs N signal points on lead 16, where a particular signal point $P_i$ is taken from a twodimensional (2D) M-PSK constellation such as is shown in FIG. 2 and is generated according to the particular block code being used. The N successive signal points output by encoder/mapper 13 on leads 16 are applied, in an original order, to interleaver 21 which reorders the signal points $P_i$ (as described more fully herein below). These reordered signal points $Q_i$, output by the interleaver on lead 24, are applied to modulator 25 whose output, in turn, is applied to fading channel 30. In the receiver, demodulator 41 and deinterleaver 44 perform the inverse functions of modulator 25 and interleaver 21, respectively. Accordingly, the output of the latter, on leads 45, is the received, but channel-corrupted sequence of signal points, $P_i$ corresponding to the sequence of signal points appearing on leads 16 at the output of encoder/mapper 13. These are applied to decoder 51 which recovers and provides, on leads 53, the originally transmitted input data. The operation of the decoder is generally that of a "maximum likelihood detector", and will, for received signal points, make a decision as to the most likely value of the transmitted signal points.

Figure 5:
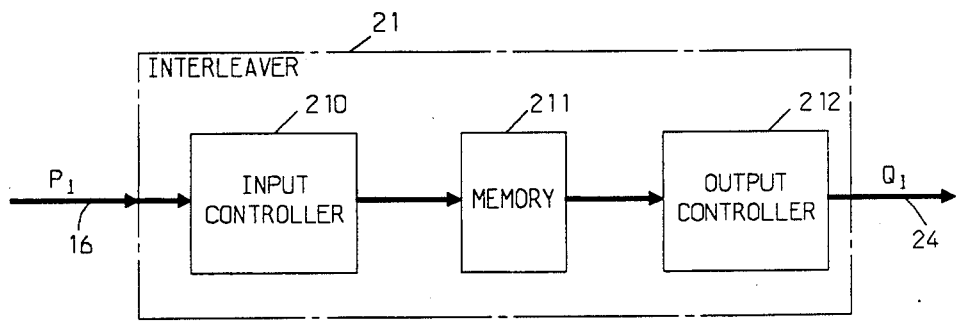
FIG. 5 is a block diagram of the interleaver of FIG. 4.
Figure 6:
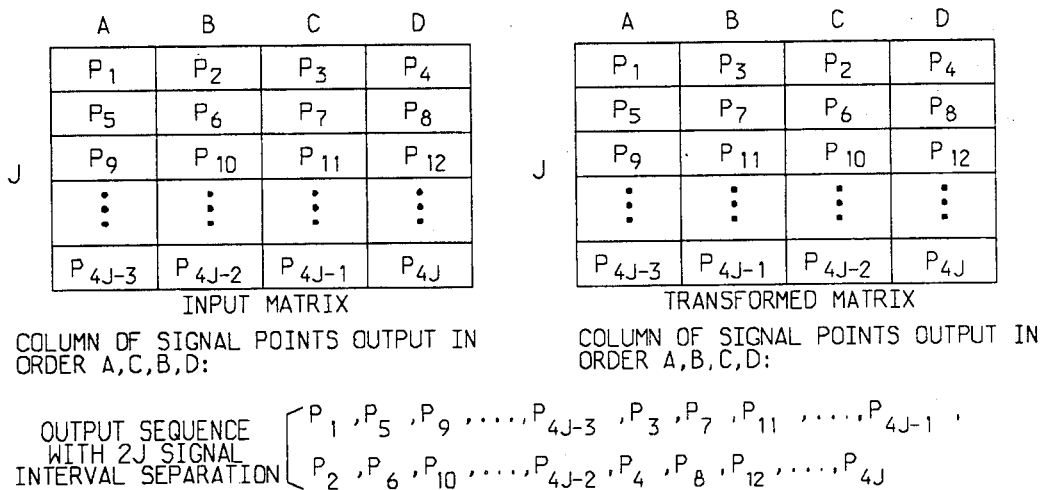
FIG. 6 illustrates the operation of the interleaver shown in FIG. 5 with respect to an eight-dimensional block code with two-fold time diversity.

A block diagram of interleaver 21 is shown in FIG. 5. Each successively input signal point $P_i$, on lead 16, is taken by input controller 210 and stored in memory element 211. The stored signal points maybe conceptualized as being in a matrix organization. As a result of the interleaver matrix organization, each successively input signal point is stored in a successive column of a particular row, up to the number of columns of the matrix, and than along successive rows of the matrix, up to the number of rows of the matrix. This is illustrated in FIG. 6 for an eight-dimensional block code (Code 3 in the aforementioned patent application) which exhibits two-fold time diversity in either the first and second signal point positions, or the third and fourth signal point positions of a codeword. That is, if a pair of codewords differ in exactly two signal point positions, then these two signal point positions are either the first and second positions, or the third and fourth positions. At a particular point in time, interleaver 21 will contain a frame of J codewords, with the first codeword ($P_1$, $P_2$, $P_3$, $P_4$) being stored in the first row, the second codeword ($P_5$, $P_6$, $P_7$, $P_8$) in the second row, etc., as illustrated in the matrix labeled "input matrix". In accordance with the invention, the columns of the interleaver are read out in the order A, C, B, D. As a result, the time-diverse interdependent signal points of any codeword that contribute to the two-fold diversity are now advantageously separated by 2J signal intervals instead of J signalling intervals as in the case of the prior art, as can be appreciated from the output sequence shown in FIG. 6. (In the most straightforward type of implementation, the output controller 212 may wait until all of the J codewords have been read in. In more efficient implementations, it may be possible for the interleaver to begin reading out signal points before all J codewords have been read in, as long as enough codewords have been read in to assure a synchronous flow of signal points on the output lead 24). It will thus be appreciated that as a result of the above approach the interleaver has been matched to the two-fold diversity of the code.

The inventive concept of matching the interleaver to the code as just described can additionally be characterized as a process by which the elements of the input matrix are reordered to create a "transformed" matrix, so that upon sequential transmission of adjacent columns of the transformed matrix, the time diverse signal points are separated by more than they would be following the prior art approached. Such a transformed matrix is shown in FIG. 6. By separately reading out adjacent columns of the transformed matrix (as in the prior art), the aforementioned output sequence again results.

In this illustrative example, the reordering was accomplished by performing an elementary transformation of the input matrix by interchanging columns B and C. An elementary transformation is formed by interchanging either two rows or two columns. More generally, a code can be matched to the interleaver by performing any appropriate reordering of the elements of the input matrix, be it one or more elementary transformations (i.e., interchanging of rows and/or columns), or some other form of reordering, (e.g., mixing of rows and columns).

Although this alternate view of matching the interleaver to the code will not be further discussed herein, it should be noted that it applies to the subsequent examples.

Besides matching the interleaver operation to a particular block code with X-fold time diversity, a block code can be matched to the existing prior art interleaver. Current known block codes only generate interdependent signal points that exhibit X-fold time diversity in adjacent signal point positions, however, by separating those adjacent X-fold time-diverse signal points, the code can be matched to the prior art interleaver. This can be illustrated by reconsidering the prior example of interleaving an eight dimensional block code, where now the interdependent signal points are re-arranged by encoder 13 so that the time diversity is exhibited between the first and third signal point positions, or the second and fourth signal point positions. The prior art interleaver will minimally separate any pair of interdependent signal points by $D_1$ (as before), and, in accordance with the invention further minimally separate those interdependent time-diverse signal points by $D_2$, such that $D_2 > D_1$.

Figures 7, 8:
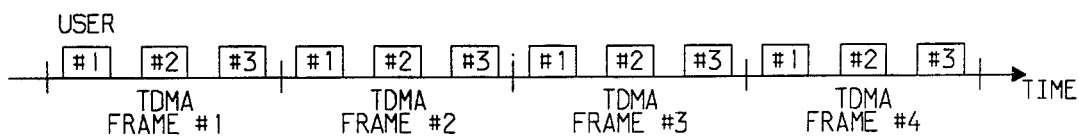
FIG. 7 illustrates a TDMA frame with three users.
FIG. 8 illustrates the operation of the interleaver, with two columns, embodying the principles of the invention with respect to a column interdependency.

In some situations, an interdependency can also exist between signal points within a particular column. As a result the rearrangement of the columns of the interleaver alone will have no effect on the separation of these interdependent signal points. In addition, if such a column interdependency exists, the error performance can be additionally effected by the M-DPSK demodulation process. (In the M-DPSK demodulation process correlated noise samples are introduced between received adjacent signal points). For example, FIG. 7 is an illustrative TDMA implementation with three users, where each user is allocated one of the three time slots in a TDMA frame and it is assumed that two columns of an interleaver can be transmitted in each time slot. If the prior art interleaver and block code illustrated in FIG. 6 were used, it would take two TDMA frames to transmit all four columns of the interleaver, and then time-diverse signal points would be separated by J signal points in a TDMA frame. However, for system consideration it maybe advantageous that the number of interleaver columns be reduced to two as shown in FIG. 8, with one column being transmitted in each time slot. As can be seen, this will now spread the four signal points of a particular codeword, such as $P_1$ and $P_3$, across adjacent rows of the interleaver. Therefore, in accordance with another feature of my invention, reordering the transmission of the rows will eliminate the demodulator induced noise and also additionally separate the signal points of a codeword in the same column. FIG. 8 illustrates this feature. During the transmission of column A, the rows are read out in the following sequence: 1,3,5,..., last odd row, 2,4,6,..., last even row. As a result, column adjacent interdependent signal points are now separated to guard against burst errors, and correlation between noise samples, introduced by the M-DPSK demodulating process, has been eliminated. (Note, in this example, the time-diverse points that contribute to the two-fold diversity of the code are still in different columns and are additionally separated by the length of the TDMA frame).

Figure 9:
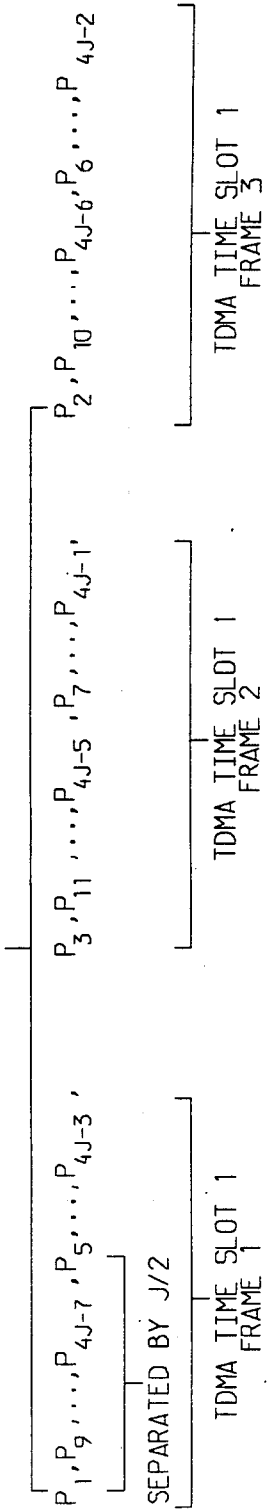
FIG. 9 illustrates the separation of a four-column interleaver with a 16-dimensional block code, in a TDMA environment, embodying the principles of the invention.

An additional interleaving example where both the columns and rows are reordered is shown in FIG. 9. In FIG. 9, using the same TDMA format, an interleaver with four columns is shown with a 16-dimensional block code (Code 5 in the earlier patent application which has eight signal points per codeword) which exhibits a two-fold time diversity in either the first and second, third and fourth, fifth and sixth, or seventh and eighth signal point positions. It is again assumed that for system considerations the number of columns of the interleaver cannot match the number of signal points in the block codeword. The columns of the interleaver are read out in the order A, C, B, D, (one column per timeslot) and, within each column, the rows of the interleaver are re-arranged such that the odd rows (1,3,5..) are transmitted first and then the even rows (2,4,6...). The column adjacent interdependent signal points are now additionally separated to eliminate the demodulator induced noise and protect against burst errors. In addition, by alternating the columns, the time diverse signal points that contribute to the two-fold diversity of the code are further separated by the width of two TDMA frames.

Figures 10, 11:
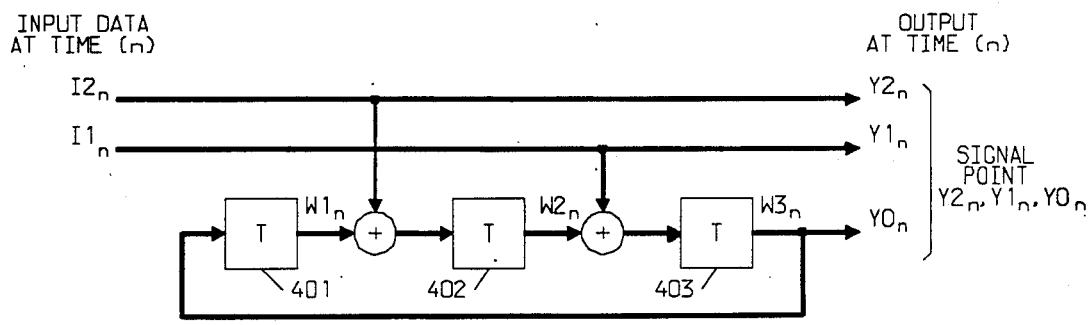
FIG. 10 depicts a coder which is used to implement an illustrative two-dimensional, 8-state, 8-PSK trellis code.
FIG. 11 shows the state transition matrix for the trellis coder of FIG. 10.

Before proceeding with an example of an interleaver matched to the time diversity of a trellis code, it will be useful at this time, to provide some general background information on trellis codes. In a trellis code, the value of a particular signal point $P_i$ is not only dependent on the current input data in a particular signalling interval, but also on prior input data from previous signalling intervals. This is shown in FIG. 10 in the context of an illustrative trellis coder where the output is a particular signal point of FIG. 2 based on the value of the binary 3-tuple $(Y2_n Y1_n Y0_n)$, and where the value of $Y0_n$ is dependent on data from previous signalling intervals as a result of the storage elements 401, 402 and 403. The outputs from these storage elements at a time (n) identifies the state of the trellis coder at time (n) which is the value of the binary 3-tuple $(W1_n W2_n W3_n)$. In this example, the storage elements are updated every signalling interval (T) and as the input data $I1_n$ and $I2_n$ vary over time, the trellis coder will traverse various states. From this a state transition matrix can be constructed as illustrated in FIG. 11. The trellis coder of FIG. 10. generates a two-dimensional 8-PSK trellis code which has 8-states.

In the state transition matrix of FIG. 11, for this illustrative trellis coder, the current state is listed along the column, the next state is listed across the row, and an element of the matrix is the signal point value associated with a transition from the current state to the next state. The blank elements of the matrix represent disallowed state transitions. For example, if currently in state (0,0,0) and the next state is also state (0,0,0), a signal point with the value of "0" is output, or if the current state is (1,0,0) and the next state is (0,1,1), the value of the signal point output is "2".

In addition, this particular illustrative trellis code also exhibits the property of time diversity which will now be briefly described. In the communication system of FIG. 4 it will now be assumed that encoder 13 is implemented by using the trellis coder of FIG. 10.

Figure 12:
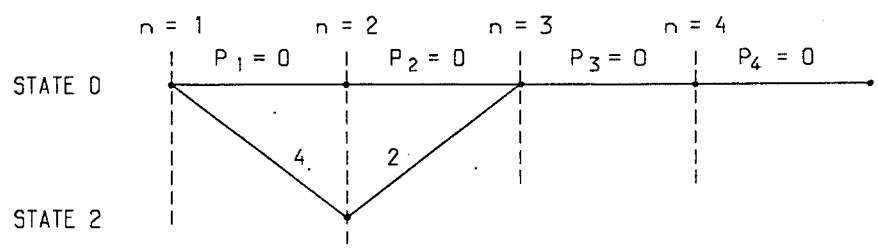
FIG. 12 depicts two-fold time diversity for the illustrative two-dimensional, 8-state, 8-DPSK code produced by the trellis coder of FIG. 10.

Assume that the initial state W1, W2, W3, of the trellis coder of FIG. 10, at time n=1, is zero. It is easy to see from FIG. 11, that any pair of permissible infinite sequences of signal points $(P_1, P_2, P_3, \ldots P_\infty)$ originated from the same initial state 0 differ in at least two signal point positions. Two such sequences that differ in only the first and the second signal points are shown in FIG. 12. The above statement is valid no matter what is the initial state. This shows that the trellis code of FIG. 10 has two-fold time diversity. It can be further verified from FIG. 11 that for each pair of permissible sequences of signal points that differ in only two signal point positions, the two signal point positions are always next to each other and the squared Euclidean distance between these two sequences is always 6, assuming that the radius of the 8-PSK constellation is one.

The decoding depth D of a trellis code is defined as follows. The trellis decoder makes a decision on a received signal point $P_n$ (See FIG. 4) only after the point $P_{n+D-1}$ is received. For a trellis code all signal points are interdependent, but for practical purposes only the sequence of any successive D signal points will be referred to as being interdependent as long as the decoding depth D is not less than the minimum decoding depth.

Figure 13:
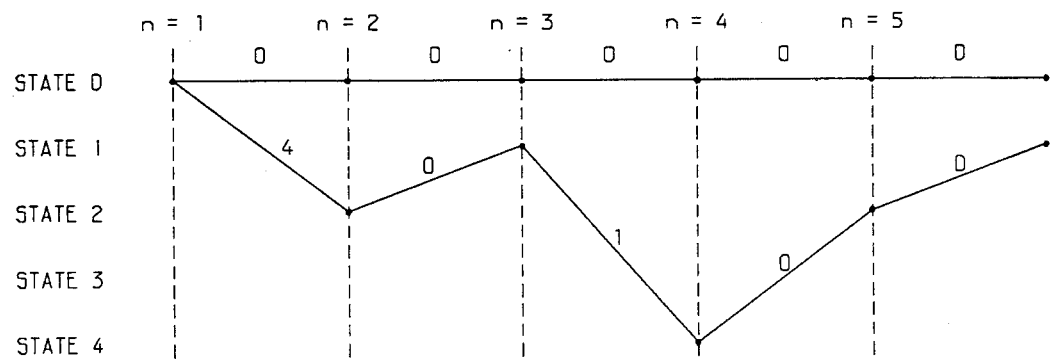
FIG. 13 illustrates two permissible signal point sequences, five signal points in length, for the illustrative trellis code from the trellis coder of FIG. 10.

The minimum decoding depth (MD) of the trellis code of FIG. 10 is determined as follows. It is chosen such that (1) the two-fold time diversity of the code is preserved in that any pair of permissible finite sequences of MD signal points long, originating from the same initial state and having different first signal points, differ in at least two signal point positions; and (2) the squared Euclidean distance between any two such permissible finite sequences of signal points differing in only two signal point positions remains at six. From FIG. 11 again, the minimum decoding depth of this trellis code can be determined to be six. This can be seen from FIG. 13. FIG. 13 shows two permissible finite sequences of five signal points long, originating from the same initial state 0 and having different first signal points 0 and 4. The two sequences differ in only two signal point positions. However, the squared Euclidean distance between the two sequences is only 4.58, smaller than 6. This figure shows that a decoding depth of five, for this illustrative trellis code, does not meet the minimum decoding depth requirement. On the other hand, a decoding depth of six or more, will ensure that any pair of permissible sequences of six or more signal points long, originating from the same initial state and having different first signal points, differ in at least two signal point positions, and if they differ in exactly two signal point positions, the squared Euclidean distance between them remains at 6. As an example, for the permissible all-zero sequence (0, 0, 0, 0, 0, 0) originating from state 0, the only other permissible sequence, originating from the same state, having different first signal points, and exhibiting two-fold time diversity is (4, 2, 0, 0, 0, 0). All other permissible sequences originating from the same state and having different first signal points differ from the all-zero sequence in at least three signal point positions.

Figure 14:
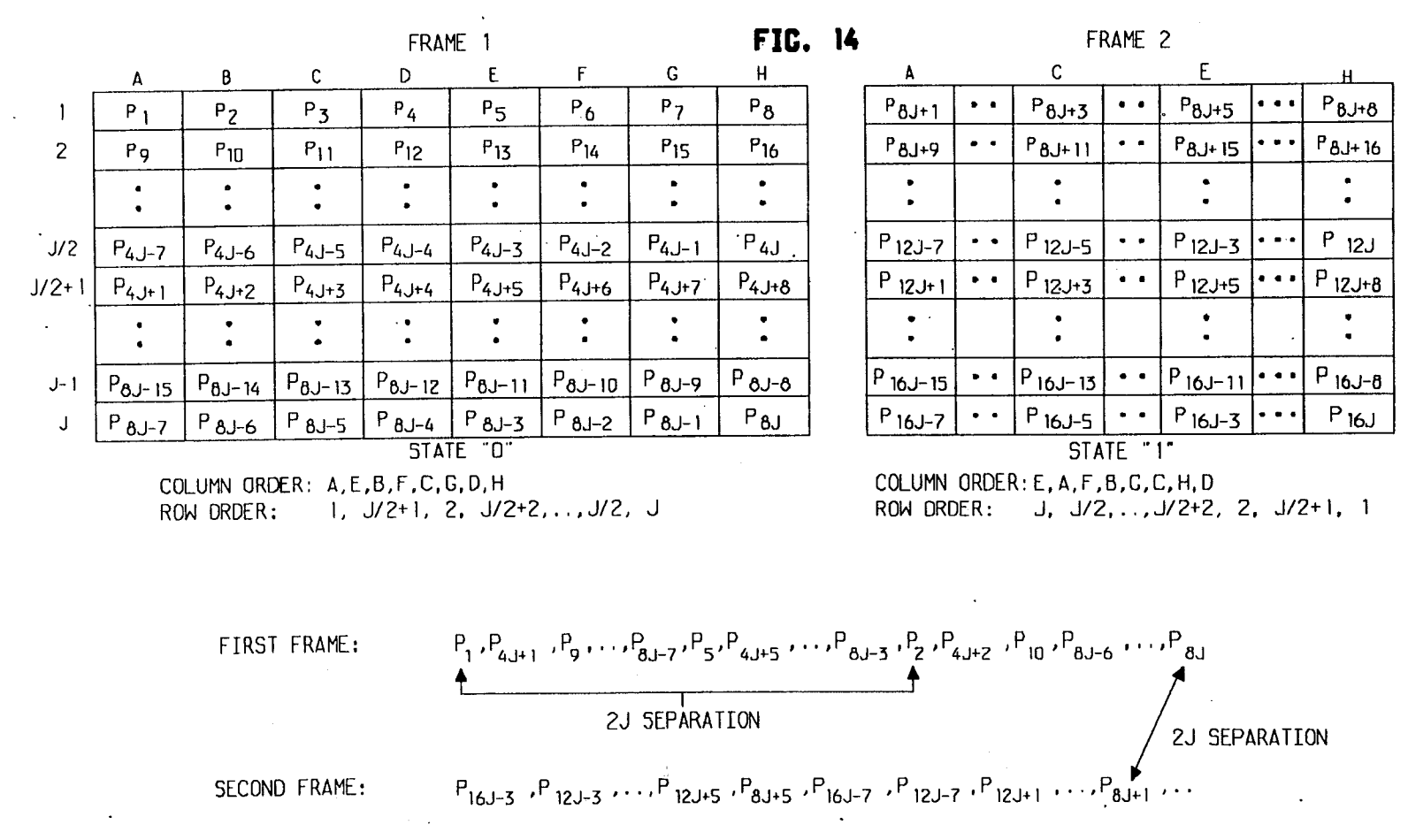

In accordance with the invention, FIG. 14 illustrates the operation of the interleaver on the illustrative trellis code (with two-fold time diversity between successive signal points) of FIG. 10. To illustrate the features of my invention, it is assumed that the decoding depth for this code is chosen to be eight (In general, the decoding depth of a trellis code is chosen to be slightly greater than its minimum decoding depth.), and that the number of columns of the interleaver is eight. By reading out the columns of the matrix in the order: A, E, B, F, C, G, D, H, any sequence of eight successive signal points (which will be used by the decoder to make a decision on the first signal point of the sequence) are separated pairwise as far as possible (by at least J−2 signaling intervals in FIG. 14). Further, any two successive signal points that contribute to the two-fold diversity of the code are now separated advantageously by at least 2J signalling intervals. In addition, by further re-arranging the rows, any correlation of demodulator induced noise is essentially removed. In this example, the re-arrangement of the rows is accomplished by reading out the rows in the following order: 1, J/2+1, 2, J/2+2,..., J/2, J. Though the above further separates successive signal points from one another by at least 2J signaling intervals for the first frame, there is still a problem in the transmission of the succeeding frame since signal points $P_{8J}$ and $P_{8J+1}$ will still be transmitted sequentially.

Therefore, in accordance with another feature of my invention, the interleaver operates in a state-dependent manner by identifying a state of "0" for the first frame and a state of "1" for the second frame, where the sequence of column and row transmission is changed between successive frames. In FIG. 14, the state of "0" is identified with the first frame, and the corresponding column and row transmission is already described. However for the second frame, a state of "1" is associated and the column and row transmission is now changed, with the columns being read out in a different order: E,A,F,B,G,C,H,D, and the rows being read out in different order: J,J/2, ..., J/2+2,2, J/2+1,1. The third frame can return to the ordering of the first frame(state 0) and the process repeats itself. In this way successive signal points are still further separated, and a separation of at least 2J signaling intervals is maintained between successive signal points across the frames.

Figure 15:
FIG. 15 illustrates the operation of a two column interleaver embodying the principles of the invention using the TDMA frame of FIG. 7.

Another example illustrates the concept of the invention in a TDMA environment as shown in FIG. 15. Here, again, the TDMA framing from FIG. 7 is used, along with a two column interleaver, and the illustrative trellis code from above and an assumed decoding depth of eight. It can be seen from FIG. 15 that adjacent signal points are split between columns A and B. These columns are additionally separated in time by the TDMA frame format. However, it would be additionally advantageous to further separate any eight successive signal points (since the decoding depth is eight), and to essentially remove the correlation of demodulator induced noise. As a result, reordering the transmission of the rows, as shown in FIG. 15, further separates successive signal points and removes the correlation of demodulator induced noise. The reordering is accomplished by observing that any eight successive signal points are generally spread across four or five consecutive rows, as a result the rows are read out in the following order: 1, J/2+1,5, J/2+5,...,J−3,2, J/2+2, etc. In this particular case, one or two interleaving states can be used. There may be only a marginal gain to using two interleaving states due to the additional separation afforded by the TDMA separation.

A final example of an interleaver embodying the principles of the invention is shown in FIG. 16. Using the same TDMA framing as in FIG. 7, a four column interleaver is used with the same illustrative trellis code and a decoding depth of eight. Here again, the columns are additionally separated by the TDMA frames and these columns A, B, C, and D are transmitted successively with successive signal points always appearing in different columns. (Note: due to the time diversity between any two successive signal points, reordering the columns could be done, but the effect would be marginal, for example, if the columns were reordered to be A, C, B, D, $P_1$ and $P_2$ would be additionally separated but not $P_2$ and $P_3$). The rows are again reordered in the following order: 1,J/2+1,3,J/2+3,. . . ,J−1,2,J/2+2, . . . ,J. As a result, any eight successive signal points are additionally separated.

From the above examples, it will be appreciated that in the general case various re-arranging methods in either the row or column dimensions of the interleaver matrix, can be used--depending on the interdependence of the signal points--in order to further separate those interdependent signal points. In particular, those signal points that contribute to the X-fold diversity of the code are further separated by more than the number of rows (J) in the interleaver. Further, subsequent frames may have to change the reordering algorithm for the rows, and/or columns, to maintain separation between those interdependent signal points across successive frames.

The foregoing merely illustrate the principles of the invention. For example, although the invention is described herein principally in terms of reading out different rows and columns of a two dimensional interleaver matrix, this same reordering can also be accomplished in the way data is input to the interleaver matrix, or in an interleaver matrix of any dimension. Further, matching the interleaver to the code can be accomplished by reordering, in any fashion, the elements of the interleaver, or input matrix, into a transformed matrix, such that, upon transmission of sequential columns, interdependent signal points are advantageously further separated. Also, besides matching the interleaver to the code, the block or trellis code can be matched to the prior art interleaver by reordering, in any fashion, the sequence of interdependent signal points generated to the interleaver such that those time-diverse interdependent signal points are not adjacent.

In addition, although the invention is described and defined herein with reference to, for example, an interleaver "matrix" and a transformed "matrix", it will be appreciated that this is but a convenient way of defining the various signal point interrelationships. Thus one may carry out the invention, in that the particular reordering of signal points taught herein is achieved, without necessarily physically storing those signals in a two-dimensional "matrix" configuration. Rather, particular memory addressing regimes or other ways of reordering the signal points which are the signal-processing equivalent of actually storing the signal points in, and reading them out from, various matrices in accordance with the principles of the invention should be understood as being encompassed by definitions of the invention which may include matrix terminology.

Finally, though the interdependent signal points were generated by block or trellis coded modulation with built in time diversity, the same approach could be used for any coding method where an interdependence of signal points exist, and an interleaver is used.

I claim:

1. Apparatus for use in a communication system comprising:
    means for encoding input data to generate a sequence of interdependent signal points, the signal points having an original order and the encoding means causing the signal points to exhibit an X-fold time diversity, where X is an integer greater than one; and
    means for interleaving the interdependent signal points to form a reordered sequence of signal points, where a) the X-fold diversity of the signal points caused by the encoding means and b) the reordering sequence of the interleaving means, are matched.

2. The invention of claim 1 wherein the reordered sequence generated by the interleaving means is such that any pair of interdependent signal points are minimally separated by a distance $D_1$, and any pair of interdependent signal points which exhibit the X-fold time diversity are minimally separated by a distance $D_2$, with $D_2$ being greater than $D_1$.

3. The invention of claim 1 wherein the encoding means produces a sequence of interdependent signal points in which any pair of the interdependent signal points which exhibit X-fold time diversity are separated.

4. Apparatus for interleaving interdependent signal points generated by encoding input data, said apparatus comprising:
    means for storing said signal points in an input matrix, each successively input signal point being stored in a successive column of a particular row, up to the number of columns of the matrix, and then along successive rows of the matrix, up to the number of rows of the matrix; and
    means for reading out said signal points to form a reordered sequence of signal points where any pair of interdependent signal points are minimally separated by a distance $D_1$, and any pair of interdependent signal points which exhibit X-fold time diversity are minimally separated by a distance $D_2$, with $D_2$ being greater than $D_1$, and where X is a selected integer greater than one.

5. The invention of claim 4 wherein the means for reading out forms a reordered sequence of signal points by reading out adjacent columns of a transformed matrix of signal points in which elements of the input matrix are reordered.

6. The invention of claim 5 wherein the means for reading out reorders the elements of the input matrix by forming an elementary transformation of the input matrix.

7. The invention of claim 5 wherein the reordering formed by the reading out means is such that adjacent signal points from a column of the input matrix are separated in the reordered sequence.

8. The invention of claim 5 wherein the reading out means operates in a state-dependent manner and the re-ordering sequence for each state is different.

9. The invention of claim 4 wherein each input signal point is taken from a two-dimensional M-PSK constellation, where M is a selected integer.

10. Apparatus for use in a communication system comprising:
   means for encoding input data to generate a sequence of interdependent signal points, said signal points having an original order, and exhibiting an X-fold time diversity, where X is a selected integer greater than one;
   means for interleaving signal points by storing each successive input signal point in a successive column of a particular row of an input matrix, up to the number of columns of the matrix, and then along successive rows of the matrix, up to the number of rows of the matrix, and by forming a reordered sequence of signal points where any pair of interdependent signal points are minimally separated by a distance $D_1$, and any pair of interdependent signal points which exhibit X-fold time diversity are minimally separated by a distance $D_2$, with $D_2$ being greater than $D_1$;
   means for transmitting the reordered signal points;
   means for receiving the transmitted reordered signal points;
   means for deinterleaving the reordered signal points to restore them to said original order; and
   means for decoding the deinterleaved signal points to recover the input data.

11. The invention of claim 10 wherein the interleaving means forms a reordered sequence of signal points by reading out adjacent columns of a transformed matrix of signal points in which elements of the input matrix are reordered.

12. The invention of claim 11 wherein the interleaving means reorders the elements of the input matrix by forming an elementary transformation of the input matrix.

13. The invention of claim 11 wherein the reordering formed by the interleaving means is such that adjacent signal points from a column of the input matrix are separated in the reordered sequence.

14. The invention of claim 11 wherein the interleaving means operates in a state-dependent manner and the re-ordering sequence for each state is different.

15. The invention of claim 10 wherein the encoding means uses a block coded modulation.

16. The invention of claim 10 wherein the encoding means uses a trellis coded modulation.

17. The invention of claim 10 wherein each input signal point is taken from a two-dimensional M-PSK constellation, where M is a selected integer.

18. The invention of claim 10 wherein the transmitting means uses M-DPSK modulation.

19. The invention of claim 10 wherein the encoding means produces a sequence of interdependent signal points where any pair of the interdependent signal points which exhibit an X-fold time diversity are separated.

20. A method of use in a communications system comprising:
   encoding input data to generate a sequence of interdependent signal points the signal points having an original order and the encoding means causing the signal points to exhibit an X-fold time diversity, where X is an integer greater than one; and
   interleaving interdependent signal points to form a reordered sequence of signal points, where a) the X-fold time diversity of the signal points caused by the encoding means and b) the reordering sequence of the interleaving means are matched.

21. The method of claim 20, wherein the interleaving step further comprises the step of reordering the input signal points such that any pair of interdependent signal points are minimally separated by a distance $D_1$, and any pair of interdependent signal points which exhibit X-fold time diversity are minimally separated by a distance $D_2$, with $D_2$ being greater than $D_1$.

22. The method of claim 20, wherein the encoding step further comprises the step of producing a sequence of interdependent signal points, where any pair of the interdependent signal points which exhibit X-fold time diversity are separated.

23. A method for interleaving interdependent signal points, generated by encoding input data, comprising the steps of:
   storing said signal points in an input matrix, each successively input signal point being stored in a successive column of a particular row, up to the number of columns of the matrix, and then along successive rows of the matrix, up to the number of rows of the matrix; and
   reading out said signal points to form a reordered sequence of signal points where any pair of interdependent signal points are minimally separated by a distance $D_1$, and any pair of interdependent signal points which exhibit X-fold time diversity are minimally separated by a distance $D_2$, with $D_2$ being greater than $D_1$, and where X is a selected integer greater than one.

24. The method of claim 23 wherein the reading out step further comprises the step of reading out adjacent columns of a transformed matrix of signal points in which elements of the input matrix are reordered.

25. The method of claim 24 wherein the reading out step further comprises the step of reordering the elements of the input matrix by forming an elementary transformation of the input matrix.

26. The method of claim 24 wherein the reading out step further comprises the step of reordering the signal points such that adjacent signal points from a column of the input matrix are separated in the reordered sequence.

27. The method of claim 24 wherein the reading out step further comprises the step of operating in a state-dependent manner where the re-ordering sequence for each state is different.

28. The method of claim 23 wherein each input signal point is taken from a two-dimensional M-PSK constellation, where M is a selected integer.

29. A method for use in a communication system comprising:
   encoding input data to generate a sequence of interdependent signal points, said input data having an original order, and exhibiting an X-fold time diversity, where X is a selected integer greater than one;
   interleaving signal points by storing each successive input signal point in a successive column of a particular row of a matrix, up to the number of columns of the matrix, and then along successive rows of the matrix, up to the number of rows of the matrix, and by forming a reordered sequence of signal points where any pair of interdependent signal points are minimally separated by a distance $D_1$, and any pair of interdependent signal points which exhibit X-fold time diversity are minimally separated by a distance $D_2$, with $D_2$ being greater than $D_1$;

transmitting the reordered signal points;

receiving the transmitted reordered signal points;

deinterleaving the reordered signal points to restore them to said original order; and decoding the deinterleaved signal points to recover the input data.

30. The method of claim 29 wherein the interleaving step further comprises the step of reading out adjacent columns of a transformed matrix of signal points in which elements of the input matrix are reordered.

31. The method of claim 30 wherein the interleaving step further comprises the step of reordering the elements of the input matrix by forming an elementary transformation of the input matrix.

32. The method of claim 30 wherein the interleaving step further comprises the step of reordering the signal points such that adjacent signal points from a column of the input matrix are separated in the reordered sequence.

33. The method of claim 30 wherein the interleaving step further comprises the step of operating in a state-dependent manner where the re-ordering sequence for each state is different.

34. The method of claim 29 wherein the encoding step uses a block coded modulation.

35. The method of claim 29 wherein the encoding step uses a trellis coded modulation.

36. The method of claim 29 wherein each input signal point is taken from a two-dimensional M-PSK constellation, where M is a selected integer.

37. The method of claim 29 wherein the encoding step further comprises the step of producing a sequence of interdependent signal points where any pair of the interdependent signal points which exhibit an X-fold time diversity are separated.

* * * * *